No. 684,541. Patented Oct. 15, 1901.
R. W. CONANT.
SYSTEM OF TESTING COILS.
(Application filed Jan. 7, 1901.)
(No Model.) 2 Sheets—Sheet 1.
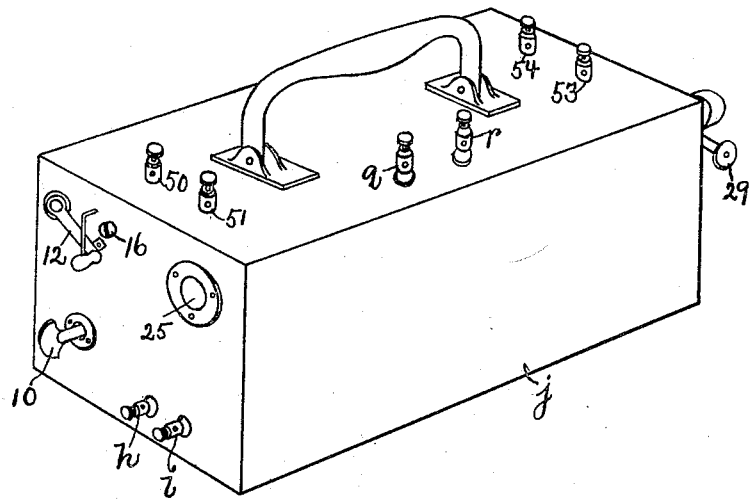
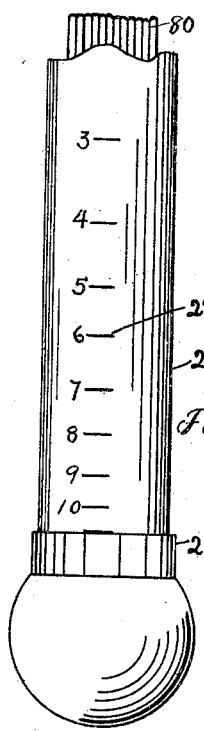
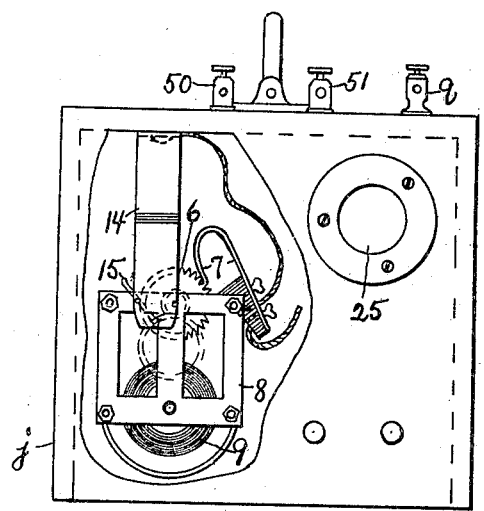
Witnesses.
C. H. Gannett
J. Murphy
Inventor.
Roger W. Conant
by Jas. F. Churchill
Atty.

No. 684,541. Patented Oct. 15, 1901.
R. W. CONANT.
SYSTEM OF TESTING COILS.
(Application filed Jan. 7, 1901.)
(No Model.) 2 Sheets—Sheet 2.

Witnesses.
C. H. Gannett
J. Murphy

Inventor.
Roger W. Conant
by Jas. H. Churchill
Atty.

ns in the claims at the end of a lever 12 on the outside of the box, the pivot

UNITED STATES PATENT OFFICE.

ROGER W. CONANT, OF BOSTON, MASSACHUSETTS.

SYSTEM OF TESTING COILS.

SPECIFICATION forming part of Letters Patent No. 684,541, dated October 15, 1901.

Application filed January 7, 1901. Serial No. 42,331. (No model.)

*To all whom it may concern:*

Be it known that I, ROGER W. CONANT, a citizen of the United States, residing in Boston, in the county of Suffolk and State of Massachusetts, have invented an Improvement in Systems for Testing Coils, of which the following description, in connection with the accompanying drawings, is a specification, like characters on the drawings representing like parts.

This invention relates to a system for testing electrical conductors, and is especially applicable, among other uses, to be employed in testing the windings or coils, either field or armature, of an electric motor or generator. For this purpose I employ, preferably, two sets of portable terminals, which are adapted to be electrically connected with two coils or windings, one of which is employed as a standard for the other. The portable terminals are connected in circuit with a self-inductive coil or coils and with a resistance coil or coils, which are connected by a bridge, preferably containing a telephone-receiver. The resistance coil or coils are included in a circuit, which is open when the instrument is not in use, which circuit contains a source of current-supply and preferably a circuit-breaker for a purpose as will be described. These and other features of this invention will be pointed out in the claims at the end of this specification.

Figure 4:
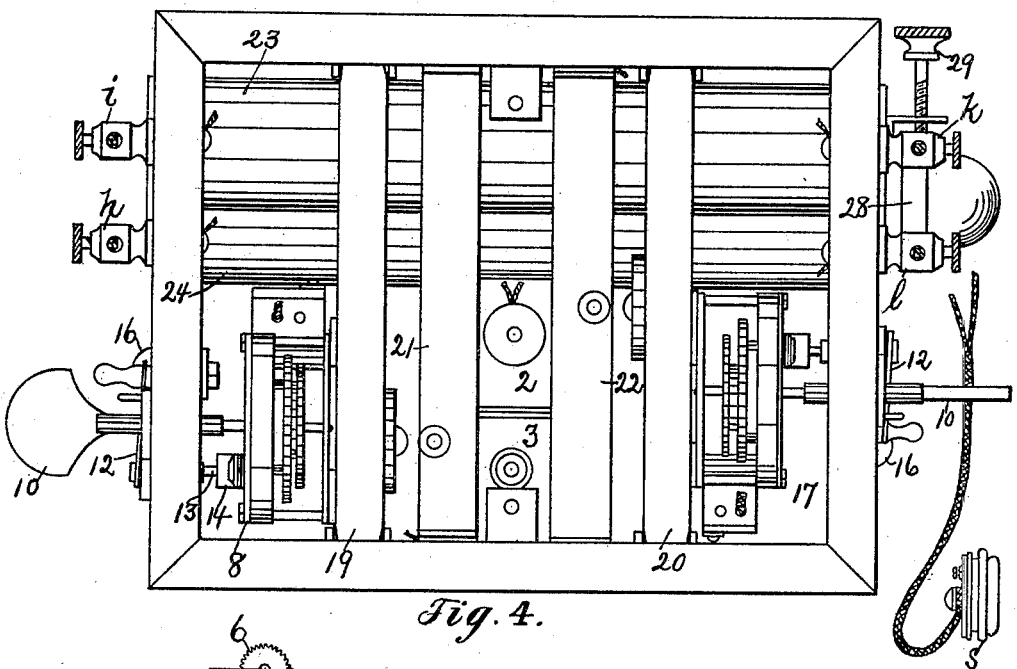

Figure 1 is a perspective view of a box or case forming part of a system embodying this invention; Fig. 2, an end elevation of the box shown in Fig. 1, with part broken away to show the circuit-breaker; Fig. 3, a detail to be referred to; Fig. 4, a plan view of the box or case inverted, the bottom being removed; and Fig. 5, a diagram to illustrate the working of the system.

Figure 5:
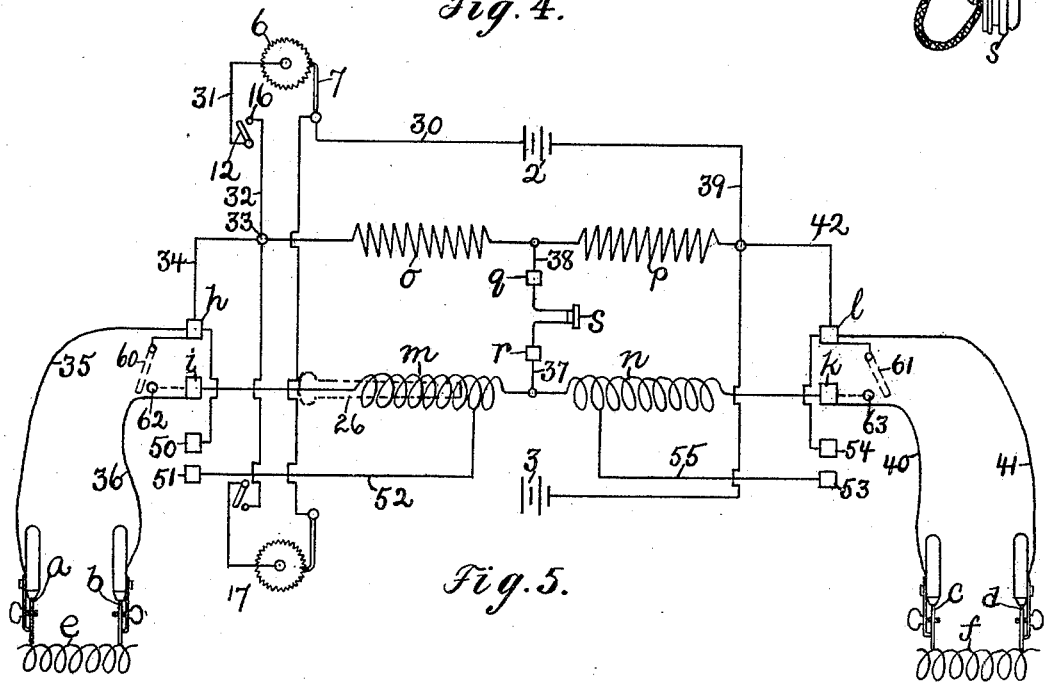

Referring to Fig. 5, $a$ $b$ $c$ $d$ represent four portable circuit-terminals, which may be of any suitable construction and preferably that herein shown. These terminals work in pairs, the terminals $a$ $b$ being designed to make contact with one coil or winding $e$, and the terminals $c$ $d$ making contact with a coil or winding $f$. The coil or winding $e$ may be supposed to be the coil to be tested and the coil $f$ a perfect coil which is used as a standard by which the coil $e$ is tested. The portable terminals $a$ $b$ are connected to binding-posts $h$ $i$ on one end of a box or case $j$, and the terminals $c$ $d$ are connected to binding-posts $k$ $l$ on the other end of the box or case. The box or case $j$ contains within it inductive coils $m$ $n$, connected together at one end and having their opposite ends connected to the binding-posts $i$ $k$. The box or case $j$ also contains resistance-coils $o$ $p$, joined together at one end and having their opposite ends connected to the binding-posts $h$ $l$. The resistance-coils are connected at their center to a binding-post $q$, and the inductive coils are connected at their center to the binding-post $r$, to which binding-posts the telephone $s$ is connected, so that, as represented in Fig. 5, the telephone is in a bridge between the inductive and resistance coils at the center of said coils. The box or case also contains a battery 2 and preferably a spare battery 3, the battery 2 being represented in Fig. 5 as the one in use, while the battery 3 is idle.

The box or case contains a circuit-interrupter, preferably of the character herein represented and comprising a break-wheel 6 and contact-pen 7, the break-wheel 6 being rotated by a clock mechanism 8 of any usual or suitable construction, the spring 9 of which is adapted to be wound up by a key 10. The rotation of the break-wheel 6 is controlled by a lever 12 on the outside of the box, the pivot 13 of which is extended through the end of the box and connected to a brake-spring 14, which normally engages the shaft of the escapement-fan 15, (see Fig. 2,) but which is adapted to be removed from engagement with said escapement-shaft when the lever 12 is moved over onto a terminal button 16, which acts to force the lever 12 outward, and thus draw the spring 14 away from the shaft of the escapement-fan. A second circuit-interrupter 17 of like construction is preferably located within the box or case, at the opposite end thereof, in condition for use in case of accident to the other interrupter. In the present instance the bottom of the box or case is made removable and the circuit-interrupters are secured to removable partition-walls 19 20. The batteries 2 3 are held in place by cross-bars 21 22, secured at their ends to the sides of the box or case.

The inductive coils and the resistance-coils are preferably provided with non-metallic casings or sleeves 23 24, which are suitably secured to the box, and the latter is provided in its opposite ends with suitable holes or openings 25 in line with the opening in the inductive coils, so that a core 26 of any suitable construction may be inserted into either of the coils m n for a purpose as will be described.

The core 26 may be composed of a hollow non-metallic plug, which is filled with iron rods 80, and the said core may and preferably will be provided with a scale 27, extended longitudinally of it, and with a metal collar 28, which in practice is engaged by a set-screw 29 to secure the core in the box when not in use.

The instrument herein shown is designed and adapted to test for short circuits, open circuits, or grounds, and before proceeding to make any of these tests the instrument itself is first tested, which is effected in the following manner: First start the circuit-breaker in operation by throwing the switch 12 onto the terminal button 16, and then bring the two terminals $a$ $b$ together. A circuit through the terminals $a$ $b$ and the telephone will be established, which circuit may be traced as follows: from the positive pole of the battery 2 by wire 30 to the contact-pen 7; thence through the break-wheel 6; thence by wire 31, connected to the clock-frame 8, to the switch-lever 12; thence by the button 16 and wire 32 to the point 33, where the wire 32 is connected to the end of the resistance $o$, at which point the current divides, a portion passing to the binding-post $h$ by wire 34; thence through the wire 35, portable terminals $a$ $b$, and wire 36 to binding-post $i$; thence by the self-inductive coil $m$ and wire 37 to binding-post $r$; thence through the telephone $s$ to binding-post $q$, thence by wire 38, resistance $p$, and wire 39 to the negative pole of the battery. If this circuit is complete, a sound is obtained at the telephone. From the point 33 a portion of the current passes through the resistances $o$ $p$ and wire 39 to the negative pole of the battery. The terminals $a$ $b$ are then opened and the terminals $c$ $d$ are brought together and a circuit through the telephone is established. This circuit may be traced as follows: from the positive pole of the battery 2 by wire 30, contact-pen 7, break-wheel 6, switch-lever 12, terminal 16, wire 32, resistance $o$, wire 38, binding-post $q$, telephone $s$, binding-post $r$, wire 37, inductive coil $n$, binding-post $k$, wire 40, terminals $c$ $d$, wire 41, binding-post $l$, wires 42 and 39 to the negative pole of the battery. If this circuit is complete, a sound will be produced at the telephone. The terminals of each set are then brought into contact with each other and are in series through the coils $m$ $n$, and no difference of potential is produced on opposite sides of the telephone. Therefore no sound is produced at the telephone. With the two sets of terminals in contact then insert the core 26 first in one coil, as $m$, and then in the other coil, $n$, and see if an increase in sound is produced in each coil as the core is inserted. If there is an increase, it will prove that that instrument is in perfect working condition. The next thing then is to make the test on the coil, (which we will suppose to be the coil $e$,) and as an example the first test will be for a short circuit, which, it will be assumed, exists in the coil $e$. In this case the mode of procedure is as follows: The clock is started. The terminals $c$ $d$ are placed on the coil $f$. The sound obtained shows that the circuit on that side is complete. The terminals $c$ $d$ are then removed and the terminals $a$ $b$ are brought in contact with the coil $e$ and a sound obtained at the telephone, which indicates that the circuit is complete on this side through the said coil. Having now ascertained that both circuits are complete, the two sets of terminals are placed in contact with their respective coils. After the four terminals are in contact with the coils, as described, the operator listens at the telephone, and if a sound is produced it shows an inequality at the two coils. This inequality may be an inequality of resistance or an inequality of induction. If of resistance, it cannot be reduced by the introduction of the core 26 into either coil of the instrument. If the inequality is one of induction, the sound is reduced when the core 26 is inserted into the inductive coil $m$ of the instrument that is connected with the weaker tested coil, which in this case is supposed to be $e$, and it is increased when inserted into the other coil $n$ of the instrument. The core 26 thus gives us a means of determining the character of the inequality as well as which coil is the weaker, assuming that the inequality is an inductive one. The core 26 is inserted until the minimum sound is produced, and the number of degrees on the graduated scale 27 of the same is read off. This figure gives an indication of the amount of inequality existing between the standard coil $f$ and the coil $e$ under test. It is found in the practical use of this instrument that in a standard street-railway motor of thirty-five-horse-power capacity perfect field-coils in the motor may show an inequality between the same style motors up to one and one-half degrees of the scale on the core 26, due to the differences in mechanical and electrical construction, while a short-circuited coil would be indicated by the insertion of the core 26 to any amount greater than this to produce a minimum sound. When a short circuit in one of the coils exists, it will be found that the core 26 usually shows an indication of three or more degrees.

The instrument is used in the following manner for testing open-circuit coils: In a coil that is one continuous winding the two terminals $a$ $b$ when touched on opposite sides of the open-circuited portion of the coil give substantially no sound in the telephone; but when touched together or on parts of the coil which are not open normal sound is produced, In case the winding to be tested consists of a number of coils joined in parallel, as in case of an armature, the above test will not indicate an open circuit in one of the coils, since the circuit will be completed by the coils that are in parallel with the open-circuited coil. Therefore in this case recourse must be had to the use of the complete instrument, and the method of procedure is exactly the same as in case of testing for short-circuited coils. In some cases it is found that the weaker side is that connected with the standard or perfect set of coils. This is due to the fact that the armature is constructed in such a manner that an open circuit between the testing-terminals opens a portion of the set of coils between the terminals, which portion when closed and complete would normally reduce the inductive capacity of the set of coils.

The self-inductive coils $m$ and $n$ are proportioned and wound so as to be equal in inductive capacity, and the resistances $o$ and $p$ are likewise equal with respect to each other.

To test for a ground, let it be assumed that the test is to be made on an armature in which a part of the winding makes contact with the core of the armature. In this case one set of terminals alone is used, which may be the terminals $a$ $b$. The mode of procedure is as follows: Assuming the clock to be started, the two terminals $a$ $b$ are brought together and a sound is obtained in the telephone. One of the terminals, as $a$, is then brought in contact with the winding or the coil to be tested, and the other terminal, as $b$, is brought into contact with the core of the armature, and if a ground between the winding and the core exists then a sound is obtained if a perfect ground exists, which sound is equal in intensity or substantially equal to the sound produced by touching the two terminals together. If no ground exists between the winding and the core, there will be approximately no sound produced at the telephone.

This instrument is especially designed and adapted for testing defects in heated coils, in which case the difference in resistance between a standard cold coil and a like coil which is heated by use in service can be disregarded, as it does not affect the sounds or indications of the instrument, which sounds are produced by the difference in inductive capacity of the two coils being tested unless the resistance is abnormally high—as, for instance, from a poor contact—in which case the cause of the sound is determined by use of the core 26, as above described, and if the sound indicates a poor contact this fault is removed before proceeding with the inductive test.

The instrument is particularly valuable for testing motors which are in actual service and in which service they become heated, so that by the deterioration of the insulation and expansion of the winding under heat a short circuit is developed which may disappear when the motor cools off.

The instrument is so proportioned that the increase in resistance of the heated coil over the standard cold coil may be neglected, or rather it does not interfere with the working of the instrument, which is based on induction rather than upon resistance.

The battery and the circuit-breaker could be placed in the bridge between the inductive and resistance coils and the telephone in the portion of the circuit from which the battery and circuit-breaker are removed; but the arrangement shown is preferred.

The battery and the circuit-breaker could be dispensed with and an alternating or pulsating current from any source employed.

When the instrument is to be used for testing coils which have few turns, and therefore low inductive capacity, the instrument may be rendered more sensitive by connecting the portable terminals $a$ $b$ to binding-posts 50 51, the latter of which is connected with fewer turns of the self-inductive coil $m$ by the wire 52, and the portable terminals $c$ $d$ are connected to like binding-posts 53 54, the former of which is connected by wire 55 to fewer turns of the self-inductive coil $n$.

This instrument may be worked without the core 26 by changing the relative position of one set of terminals, so as to obtain the balance by including more or less induction in that side, as the case may be.

The instrument may be provided with short-circuiting switches 60 61, connected, as shown, to the binding-posts $h$ and $l$ and coöperating with terminals 62 63, connected with binding-posts $i$ and $k$, so that when the switches 60 and 61 are in contact with the terminals 62 and 63 the portion of the instrument within the box or case is short-circuited, and by starting the circuit-breaker the operator can obtain varying sounds by the insertion of the core 26 in either of the coils $m$ or $n$, and these sounds will vary according to the amount the core is inserted into the coil. In this manner the operator may obtain a sound equal or substantially equal to the sound produced in the instrument when coils are tested, and by noting the indication on the scale of the core 26 he can make a record of such intensity for each test.

I claim—

1. In a system of the character described, the combination with four portable terminals, of self-inductive coils connected in circuit with said portable terminals, resistance-coils in circuit with said self-inductive coils, a source of current-supply, and means for indicating a difference in the self-inductive capacity of the two sides of the circuit, for the purpose specified.

2. In a system of the character described, the combination with two sets of portable terminals, of self-inductive coils connected in circuit with said portable terminals, resistance-coils in circuit with said inductive coils, a telephone and a source of current-supply in circuit with said coils, means for interrupting the circuit, and means for varying the inductive capacity of the portion of the circuit connected with either set of portable terminals, for the purpose specified.

3. In a system of the character described, the combination with two portable terminals, a self-inductive coil in circuit with said portable terminals, a telephone in series circuit with said inductive coil, a source of current-supply, and means for interrupting the circuit, substantially as and for the purpose specified.

4. In a system of the character described, the combination with a resistance-coil, a self-inductive coil, a source of current-supply, means for indicating self-induction in the self-inductive coil, and means for varying said self-induction, substantially as and for the purpose specified.

5. A system for testing coils, windings, &c., by a comparison of sounds due to variations in the self-inductive capacity of the opposite sides of a circuit, it comprising portable terminals adapted to be brought in contact with a coil or winding to be tested, portable terminals adapted to be brought in contact with a coil which is used as a standard for the tested coil, a source of current-supply, self-inductive coils and resistance-coils in circuit with the standard coil and the coil to be tested, a telephone, means for interrupting the circuit, and means for varying the inductive capacity of either side of said circuit, substantially as described.

6. A system for testing coils, windings, &c., by a comparison of sounds due to variations in the self-inductive capacity of the opposite sides of a circuit, it comprising portable terminals adapted to be brought in contact with a coil or winding to be tested, portable terminals adapted to be brought in contact with a coil which is used as a standard for the tested coil, a source of current-supply, self-inductive coils and resistance-coils in circuit with the standard coil and the coil to be tested, a telephone, and means for varying the inductive capacity of either side of said circuit, substantially as described.

7. A system for testing coils, windings, &c., by a comparison of sounds due to variations in the self-inductive capacity of the opposite sides of a circuit, which comprises a box or case containing self-inductive coils, resistance-coils in circuit with the self-inductive coils, a battery and a circuit-interrupter, a telephone connected to said box in circuit with said inductive and resistance coils, a pair of portable terminals connected to the box in circuit with one side of the inductive and resistance coils, and adapted to be brought in contact with a coil or winding to be tested, a second pair of portable terminals connected to the box in circuit with the opposite side of the said inductive and resistance coils, and adapted to be brought in contact with a second or standard coil, and a core for the inductive coils adapted to be inserted into either self-inductive coil, substantially as and for the purpose specified.

In testimony whereof I have signed my name to this specification in the presence of two subscribing witnesses.

ROGER W. CONANT.

Witnesses:
JAS. H. CHURCHILL,
J. MURPHY.